Dec. 30, 1952 C. B. P. MYERS 2,623,777
GAFF HOOK AND MOVABLE HOOK HOLDING MEANS THEREFOR
Filed May 10, 1949 2 SHEETS—SHEET 2

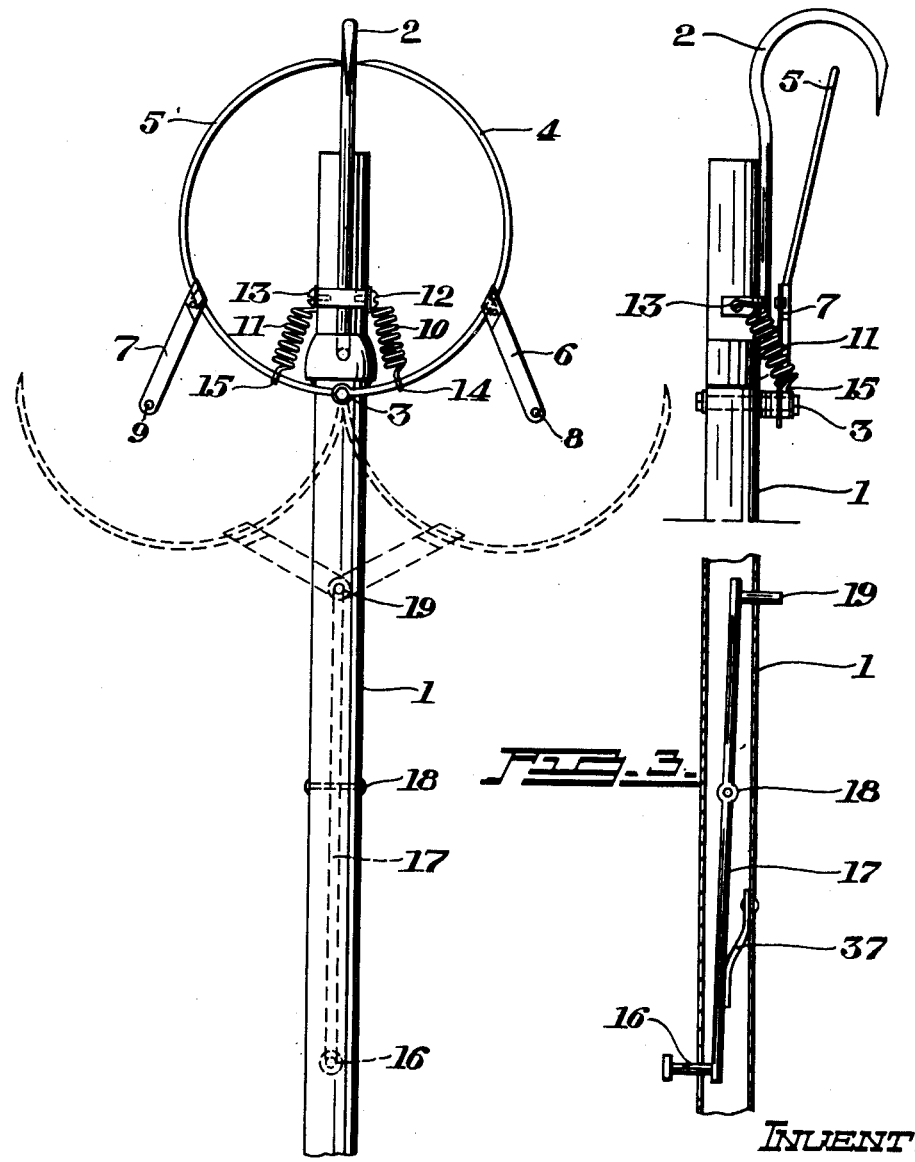

Inventor
Charles B. P. Myers
BY Smart & Bigger
Att'ys.

Patented Dec. 30, 1952

2,623,777

UNITED STATES PATENT OFFICE 2,623,777

GAFF HOOK AND MOVABLE HOOK HOLDING MEANS THEREFOR

Charles B. P. Myers, Victoria, British Columbia, Canada

Application May 10, 1949, Serial No. 92,291

5 Claims. (Cl. 294—104)

This application is a continuation-in-part of my application Serial No. 50,033, filed on September 20, 1948, now abandoned.

This invention relates to new and useful improvements in seabeam gaffs and fishing hooks.

In the use by fisherman of an ordinary gaff hook, which comprises a handle having a hook on one end of it, there is a comparatively large loss of fish during the gaffing and landing operation, such loss in commercial fishing operations amounting in some instances to as much as 20% of the total catch. It can be realized, therefore, that the provision of a gaff hook which will avoid all or substantially all of such loss is a very important consideration to commercial fishermen.

The present invention overcomes the difficulties encountered with respect to the loss of fish where an ordinary gaff hook is used. Broadly speaking, it consists of a gaff comprising a handle having a fixed hook on one end of it and one or more movable hooks pivoted on the same end of the handle, with means being provided for holding such movable hook or hooks in what may be termed the disengaged position, that is, the position in which the hook is fixed prior to the gaffing operation, so that a fish may be gaffed on the fixed hook in the usual way and thereafter the movable hook or hooks may be released to engage the fish so that it cannot escape. Means are provided in association with the handle for disengaging the movable hook holding means and the movable hook or hooks, upon being released from the disengaged position, are caused by spring means to move downwardly into engaging position. Thus when the fish is gaffed on the ordinary gaff hook, the movable hook or hooks are released and are urged downwardly by the spring means to engage with the fish so that it is held in two or more places by the gaff hook.

In the drawings:

Fig. 1 is a plan view of the gaff showing two movable hooks in engaging position, their disengaged position being shown by means of dotted lines;

Fig. 2 is a side elevation of the hook part of the device illustrated in Figure 1;

Fig. 3 is a side elevation showing details of the trigger mechanism illustrated in Figure 1;

Figures 4, 5, 6:
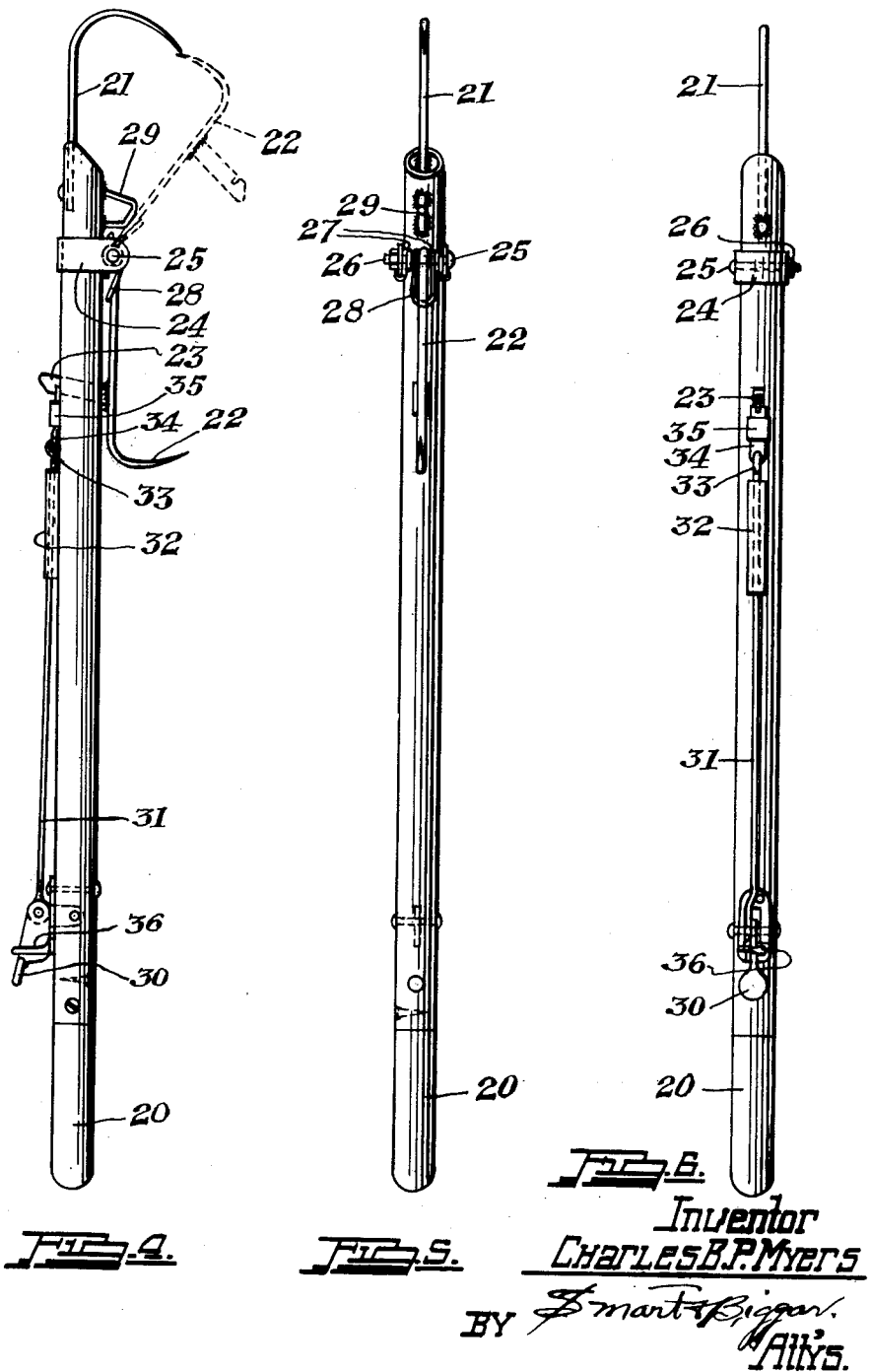
Fig. 4 is a side elevation of an alternative arrangement showing one fixed and one movable hook and the releasing mechanism for the removable hook.
Fig. 5 is a bottom plan view of the device of Figure 4.
Fig. 6 is a top plan view of the same device.

Referring now to Figures 1–3, the handle 1 of the gaff has on one end, an ordinary gaff hook 2. Pivoted at 3 are two movable hooks 4 and 5 rigidly secured to which are arms or bars 6 and 7 having in their outer extremities holes 8 and 9. Springs 10 and 11 are rigidly secured at their lower ends to the gaff handle, as indicated at 12 and 13. The said springs have on their upper ends rings 14 and 15 through which the movable hooks 4 and 5 are placed so that the said springs may act on the said movable hooks to bring them into engaging position when the trigger mechanism is released. The weight and size of the said springs will depend upon the size of the gaff, and will be obvious to anyone skilled in the art.

Within the handle of the gaff is provided a trigger mechanism, the trigger 16 being convenient to the hand of the fisherman. Such trigger is secured to a bar or rod 17 within the handle, which is pivoted therein at 18, and held in the position shown in Figure 3 by means of a piece of spring steel 37. On the opposite end of the bar 17 is a stud 19 adapted to be engaged when in raised position by the arms 6 and 7, the holes 8 and 9 of the said arms being of such a size that the said stud will fit within them. When the trigger 16 is pressed inwardly, the bar 17 moves about the pivot 18 against the action of the piece of spring steel 37 and the stud 19 is retracted, thereby releasing the two movable hooks so that they will, by reason of the effect of the springs 10 and 11, be brought into engaging position. It will be obvious, of course, that the trigger may be designed in several different shapes and forms and that the locking mechanism for holding the movable hooks in disengaged position is not necessarily limited to the design shown in the drawings, these being given by way of example only.

When the gaff is made ready for use, the movable hooks are placed in their disengaged position as shown by the dotted lines in Figure 1 of the drawings, with the springs 10 and 11 distended, creating a downward pull on the movable hooks 4 and 5. When a fish is brought alongside and gaff is to be used, the fish is gaffed in the normal manner by means of the fixed hook 2. Immediately this is done, the fisherman presses the trigger 16 thus disengaging the arms 6 and 7 from the stud 19 and releasing the movable hooks which are caused by the springs 10 and 11 to snap downwardly into the fish so that it is held in three different places, thus preventing it getting off the fixed hook 2, and escaping.

An alternative form of the invention is shown in Figures 4, 5 and 6, wherein a handle 20 has a similar fixed gaff hook 21 in or on its lowermost end. A movable hook 22 having a latch 23 thereon is pivoted on a collar 24 surrounding the handle near its lowermost end. Any well known means for affixing the pivot 25 to the lowermost end of the handle may be employed. In the drawings the pivot 25 is shown as being an ordinary nut and bolt 26 which is inserted through the eye in the movable hook. It has a double coil spring 27 therearound which is adapted to force the movable hook 22 downwardly in the direction of the fixed hook 21. The double coil spring is shown exerting pressure on the hook 22 at 28. A stop 29 prevents the end of the movable hook going beyond the end of the fixed hook when the trigger mechanism has been released.

The trigger mechanism comprises a trigger 30 placed near the top of the handle in a position of easy access to the hand of the fisherman. Pivoted to the trigger 30 is a release rod 31 which passes through a guard 32 on the handle and is connected at its opposite end 33 to a slide block 34 which operates in a guide 35. A safety catch 36 is provided on the trigger so that it cannot be accidentally tripped.

When the gaff is made ready for use, the movable hook is retracted into disengaged position where it is held by means of the latch 23 engaging the lower end of the slide block 34. The fish is first gaffed on the fixed hook 21. Immediately thereafter, the fisherman trips or presses the trigger 30 downwardly. This causes the release rod 31 to move upwardly towards the hand of the fisherman, thereby drawing the slide block 34 in the same direction, thus releasing the latch 23 and allowing the double coil spring 27 to cause the hook 22 to move downwardly and engage the fish. The fish is thus held by the hook 21 and by the hook 22 and cannot escape.

The materials from which the gaff is made are a matter of choice, as there are a number of suitable materials for the various parts of it, as will be obvious. The handle, for example, may be partly of wood and partly of metal. The gripping portion may suitably be made of wood whereas the remaining portion of it may be of brass tubing or of aluminum tubing, for example. It is preferable to make the hooks of spring steel for durability. The fixed hook may, for example, be made of one-quarter inch round spring steel and the movable hook or hooks may be made of three-sixteenth inch round spring steel for ordinary commercial ocean fishing, such as is experienced on the Pacific Coast.

While the importance of the invention to commercial fishermen has been stressed, a gaff of the kind described can also be used to great advantage by persons who fish for pleasure. It may be made in varying sizes depending upon the size and type of fish for which it is to be employed.

The invention can also be incorporated in the usual kind of fish hook. The latch or other movable hook-retaining mechanism is incorporated in the shank of the main or fixed hook, and a line is attached to suitable trigger mechanism for tripping it, once a fish has been hooked on the main hook. The movable hooks are also affixed to the shank of the main fish hook in the same manner as they are affixed to the gaff handle, the handle of the gaff and the shank of the hook being equivalents for the purposes of the invention. The term "handle" as used in the claims is therefore intended to cover either the handle of a gaff hook or the shank of a fishing hook.

What I claim as my invention is:

1. A hook for fishing comprising a handle having a fixed hook on one end thereof, a movable hook on the same end thereof, a pivot on the said handle for the said movable hook, a spring about the said pivot cooperating with the movable hook to force it into engaging position upon release from the disengaged position, a trigger on the said handle, a release rod pivoted at one end to the trigger, a slide-block to which the other end of the said release rod is affixed, guide means for the said slide-block, and a latch affixed to the said movable hook adapted to engage with the slide-block when the said movable hook is in disengaged position.

2. A hook for fishing as claimed in claim 1 wherein a guard is provided for the said release rod.

3. A hook for fishing as claimed in claim 1, wherein a safety catch is provided on the said trigger.

4. A hook for fishing as claimed in claim 1 wherein a stop is provided on the lowermost end of the handle to prevent the movable hook from passing a predetermined position upon the release thereof.

5. A hook for fishing comprising a handle having a fixed hook on one end thereof, a movable hook on the same end thereof, a pivot on the said handle for the said movable hook, a spring about the said pivot cooperating with the movable hook to force it into engaging position upon release from the disengaged position, a trigger on the said handle, a safety catch on the said trigger, a release rod pivoted at one end to the trigger, a slide-block to which the other end of the said release rod is affixed, guide means for the said slide-block, a guard for the said release rod on the said handle, a latch affixed to the said movable hook adapted to engage with the slide-block when the said movable hook is in disengaged position, and a stop provided on the lowermost end of the handle to prevent the movable end of the hook from passing a predetermined position when it comes into engaging position.

CHARLES B. P. MYERS.

REFERENCES CITED

The following references are of record in the file of this patent:

UNITED STATES PATENTS

| Number | Name | Date |
| --- | --- | --- |
| 784,747 | Lobit | Mar. 14, 1905 |
| 1,080,868 | Turner | Dec. 9, 1913 |
| 1,110,213 | Kratochwill | Sept. 8, 1914 |
| 1,489,581 | Lynch | Apr. 8, 1924 |
| 1,578,711 | Churchill | Mar. 30, 1926 |
| 1,665,661 | Glessale | Apr. 10, 1928 |
| 2,155,913 | Thompson et al. | Apr. 25, 1939 |
| 2,191,170 | Keehn et al. | Feb. 20, 1940 |
| 2,311,401 | Lange | Feb. 16, 1943 |
| 2,454,460 | Koepke | Nov. 23, 1948 |
| 2,528,229 | Kelly | Oct. 31, 1950 |

FOREIGN PATENTS

| Number | Country | Date |
| --- | --- | --- |
| 5,491 | Great Britain | Mar. 28, 1891 |
| 615,014 | Great Britain | Dec. 31, 1948 |